Patented Mar. 5, 1929.

1,704,037

UNITED STATES PATENT OFFICE.

CHARLES EBERT, OF LEONIA, NEW JERSEY, AND WILLIAM B. NEWKIRK, OF RIVERSIDE, ILLINOIS, AND MEYER MOSKOWITZ, OF SPRING VALLEY, NEW YORK, ASSIGNORS TO INTERNATIONAL PATENTS DEVELOPMENT COMPANY, OF WILMINGTON, DELAWARE, A CORPORATION OF DELAWARE.

MANUFACTURE OF DEXTROSE.

No Drawing.   Application filed December 30, 1927.   Serial No. 243,760.

Our invention relates to the treatment of hydrol, that is to say the mother liquor obtained from the manufacture of dextrose or corn sugar; and a primary object of the invention is to provide a simple and economical method of treating such moter liquors (whether derived from the centrifugals in the manufacture of a high purity crystalline dextrose, or from the hydraulic presses in the case of the manufacture of pressed block sugars, or from other sources) so that the "purity" or dextrose content of the liquor will be increased and the liquor be given a value much in excess of the value of hydrol which is a by-product of very limited utility.

A further object of the invention is to provide a method of manufacturing from hydrol a crystalline or granular dextrose product of fairly high purity.

In our application for manufacture of dextrose, filed April 1, 1927, Serial No. 180,331, is disclosed a method of increasing the purity of hydrols involving the elimination from the liquor, before the converting or hydrolyzing step, of substances tending to catalyze dextrose to the higher sugars; and also involving conversion of the purified solution in a glass enamel-lined converter or vessel the walls of which are not subject to chemical reaction with the hydrolyzing acid. By this method it is possible to transform hydrols having purities ranging from 65 per cent dextrose to 75 per cent dextrose into liquors having purities considerably over ninety per cent.

We have now discovered that it is possible, by a method considerably simpler and more economical than the method just mentioned, to increase the dextrose content of hydrols to a very considerable extent, if not to the higher purities obtainable by the other method. That is, it is possible to increase the dextrose content of hydrol from 70 per cent, or thereabouts, to approximately 90 per cent without resorting to either the neutralization expedient of the former method or to the somewhat expensive method of converting in glass.

In carrying out the present method we preferably proceed as follows:

The hydrol, for example a hydrol consisting of 70 per cent dextrose, approximately 4 per cent of ash (resulting from the neutralization of the acid used for converting the starch) and the balance polysaccharides, probably formed by the condensation of dextrose during the conversion of the starch, is first diluted with water so that it will have a density not substantially in excess of 13° to 14° Baumé. The liquor may be lighter than this if desired. In speaking of the "neutralization" of the acid, we do not intend to imply that all of the acid is combined with the basic substance used as a neutralizer so that the solution itself is neutral. Ordinarily, in fact, only a portion of the acid is thus "neutralized", this term being used, as is customary in the art, to describe a reduction in acidity of the solution whether to the neutral point or not.

This liquor is introduced into an autoclave or converter such as is used for the conversion of starch with a large enough quantity of acid, hydrochloric acid for example, or any of the other acids used as hydrolyzing agents in the conversion of starch to dextrose, so that there will be in the solution a relatively large amount of acid in a free and active state in excess of that which is buffered or made inactive by the presence of the salts. Assuming that the hydrol originally has an acidity of pH=4 to pH=4.5 there should be added to 2,500 gallons of the liquor from 130 to 135 pounds of commercial hydrochloric acid having a concentration of 28 per cent. If other acids are used, or if hydrochloric acid is used at a different concentration, or if the acidity of the solution in the first place is more or less than that indicated, the amount of acid added should be such as to give an acidity equivalent to that produced by the above specified amount of hydrochloric acid at the concentration indicated, that is to say an acidity measured on the hydrogen ion scale, below pH=2.0, the preferred acidity being pH=1.8.

When the acid is used in the quantity indicated it appears to overbalance, to some extent at least, the effect, probably catalytic, of the impurities, metallic and organic, which tend to bring about condensation of the dextrose to polysaccharides. At least it has been found possible by following the procedure above set forth, conversion being preferably at 45 pound pressure, the customary pressure for starch conversion, to increase the dextrose content of the hydrol from 70 per cent to approximately 90 per cent. Hydrols of purities ranging from 65 per cent to 75 per cent could be treated in the manner to give substantially the same result. In fact, the method is applicable to any dextrose solution containing polysaccharides resulting from condensation of dextrose.

The converted hydrol resulting from this process will be rather dark in color so that it may not be desirable to use it for the production of block sugar, or pressed sugar, but a granular or crystalline sugar may be produced therefrom which will have a purity of 95 per cent, or above, making the product comparable in all respects to pressed sugars of the highest quality.

Such crystalline product may be made as follows:

The converted hydrol is neutralized with sodium carbonate, or other suitable neutralizing agent depending upon the hydrolyzing acid employed, to an acidity of $pH = 4.2$. It is then filtered over bone char or given equivalent absorption treatment to reduce discoloration. It is then evaporated to approximately 30° Baumé and again filtered over bone char and then evaporated to approximately 39° Baumé. The evaporated liquor is then introduced into crystallizers and supersaturation brought about and maintained by temperature reduction with gentle agitation of the magma according to the method, for example, described in patents to Newkirk 1,471,347, October 23, 1923, and 1,521,830, January 6, 1925; or other methods of crystallization may be used. When sufficient crystals have been formed the magma is centrifuged, while in a fluent state, to extract the mother liquor. The centrifuged crystal mass may be washed with fresh water if necessary to give the required purity. The resultant crystalline substance may have a purity of approximately 95 per cent and a color light yellow to white, not unlike the color of the pressed sugar known as Argo sugar. A higher purity could be obtained by further washing.

We claim:

1. Method of treating hydrol to increase its dextrose content which consists in subjecting the solution to a hydrolyzing operation in the presence of sufficient acid to give the liquor an acidity of $pH = 2.0$ or lower.

2. Method of treating hydrol to increase its dextrose content which consists in subjecting the solution to a hydrolyzing operation in the presence of sufficient acid to give the liquor an acidity of approximately $pH = 1.8$.

3. Method of treating hydrol to increase its dextrose content which consists in diluting the hydrol with water and heating it under pressure with an acid to hydrolyze the polysaccharides to dextrose.

4. Method of treating hydrol to increase its dextrose content which consists in diluting the hydrol with water to a density not substantially greater than 14° Baumé and heating it under pressure with an acid to hydrolyze the polysaccharides to dextrose.

5. Method of treating hydrol having a dextrose content of from 65 per cent to 75 per cent to increase said dextrose content which consists in diluting the liquor with water to a density not substantially greater than 14° Baumé, subjecting the diluted liquor to a hydrolyzing operation in the presence of commercial hydrochloric acid of 28 per cent concentration, or its equivalent, in proportion of from 130 to 135 pounds of acid to 2,500 gallons of the liquor.

6. Method of treating hydrol having a dextrose content of from 65 per cent to 75 per cent to increase said dextrose content which consists in diluting the liquor with water to a density not substantially greater than 14° Baumé, subjecting the diluted liquor to a hydrolyzing operation with sufficient acid to give the solution an acidity of $pH = 2.0$ or below.

7. Process of making crystalline dextrose from hydrol which consists in converting the hydrol in the presence of a hydrolyzing acid, reducing the acidity of the converted liquor by treatment with a neutralizing agent, giving the liquor an adsorption treatment, bringing about supersaturation of the liquor to produce crystallization of the dextrose and centrifuging the magma while in a fluent state.

8. Process of making crystalline dextrose from hydrol having a dextrose content of from 65 per cent to 75 per cent which consists in heating the liquor in the presence of an acid which hydrolyzes the polysaccharides to dextrose to increase the dextrose content of the liquor to approximately 90 per cent, reducing the acidity of the converted liquor by treatment with a neutralizing agent, giving the liquor an adsorption treatment, bringing about supersaturation of the liquor to produce crystallization of the dextrose and centrifuging the magma while in a fluent state.

9. Process of making crystalline dextrose from hydrol which consists in converting the hydrol in the presence of a hydrolyzing acid, reducing the acidity of the converted liquor by treatment with a neutralizing agent, giving the liquor an adsorption treatment, evaporating the liquor and giving it another adsorption treatment, bringing about the supersaturation of the liquor to produce crystallization of the dextrose, and centrifuging the magma while it is in a fluent state.

10. Process of making crystalline dextrose from hydrol having a dextrose content of from 65 per cent to 75 per cent which consists in diluting the liquor with water to give it a density not substantially in excess of 14° Baumé, converting it with heat and under pressure in the presence of from 130 to 135 pounds of hydrochloric acid of 28 per cent concentration, or its equivalent, to 2,500 gallons of the liquor, until the dextrose content of the liquor has been increased to approximately 90 per cent, reducing the acidity of the converted liquor by treatment with a neutralizing agent, filtering over bone char, evaporating the liquor to approximately 30° Baumé, filtering again over bone char, evaporating the liquor to approximately 39° Baumé, bringing about supersaturation of the liquor to produce crystallization of the dextrose, and centrifuging the magma while in a fluent state.

11. Process of treating hydrol having a dextrose content of from 65 per cent to 75 per cent which consists in diluting the hydrol with water and subjecting the same to a hydrolizing operation in the presence of enough acid to convert the polysaccharides to dextrose and continuing the conversion until the liquor has a dextrose content of substantially 90 per cent.

CHARLES EBERT.
WILLIAM B. NEWKIRK.
MEYER MOSKOWITZ.